(12) United States Patent
Gupta

(10) Patent No.: US 12,177,665 B2
(45) Date of Patent: Dec. 24, 2024

(54) SYSTEM FOR PROCESSING MOBILE RESOURCE TRANSFERS USING SECURE TOKENS ON A DISTRIBUTED REGISTER

(71) Applicant: BANK OF AMERICA CORPORATION, Charlotte, NC (US)

(72) Inventor: Saurabh Gupta, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 546 days.

(21) Appl. No.: 17/533,638

(22) Filed: Nov. 23, 2021

(65) Prior Publication Data
US 2023/0164557 A1 May 25, 2023

(51) Int. Cl.
| | |
|---|---|
| H04W 12/06 | (2021.01) |
| G06F 16/27 | (2019.01) |
| H04L 67/06 | (2022.01) |
| H04W 4/20 | (2018.01) |
| H04W 12/069 | (2021.01) |

(52) U.S. Cl.
CPC .......... *H04W 12/069* (2021.01); *G06F 16/27* (2019.01); *H04L 67/06* (2013.01); *H04W 4/20* (2013.01)

(58) Field of Classification Search
CPC ....... H04W 12/069; H04W 4/20; H04W 4/40; H04W 12/06; G06F 16/27; H04L 67/06; H04L 2209/80; H04L 9/50
See application file for complete search history.

(56) References Cited

U.S. PATENT DOCUMENTS

| | | |
|---|---|---|
| 8,321,921 B1 | 11/2012 | Ahmed et al. |
| 8,543,665 B2 | 9/2013 | Ansari et al. |
| 8,584,225 B1 | 11/2013 | Kennedy et al. |
| 8,613,052 B2 | 12/2013 | Weiss |
| 8,849,246 B2 | 9/2014 | Daigle |
| 9,565,178 B2 | 2/2017 | Sondhi et al. |
| 9,609,020 B2 | 3/2017 | White et al. |
| 9,760,291 B2 | 9/2017 | Beale et al. |
| 9,773,107 B2 | 9/2017 | White et al. |
| 9,887,995 B2 | 2/2018 | Rotter et al. |
| 10,129,211 B2 | 11/2018 | Heath |
| 10,331,695 B1 | 6/2019 | Stickle |
| 10,419,463 B2 | 9/2019 | Muddu et al. |
| 10,462,142 B2 | 10/2019 | Pattar et al. |
| 10,511,589 B2 | 12/2019 | Gangawane et al. |
| 10,846,390 B2 | 11/2020 | Subramanian et al. |

(Continued)

*Primary Examiner* — Nader Bolourchi
(74) *Attorney, Agent, or Firm* — Moore & Van Allen PLLC; Seongun M. Hong

(57) ABSTRACT

A system is provided for processing mobile resource transfers using secure tokens on a distributed register. In particular, each mobile device may be associated with a unique, immutable data identifier that may be stored within the distributed register. Resource transfers initiated by the mobile device may be authenticated by the resource transfer servers using the secure token associated with the mobile device along with the resource transfer data or metadata transmitted by the mobile device. Based on the historical data associated with the mobile device in conjunction with the secure token and resource transfer data and metadata, the resource transfer server may initiate an authorization process on the resource transfer requested by the mobile device. In this way, the system provides a secure way to process mobile resource transfers.

20 Claims, 3 Drawing Sheets

(56) References Cited

U.S. PATENT DOCUMENTS

| | | |
|---|---|---|
| 10,986,124 B2 | 4/2021 | Thomas et al. |
| 2016/0005032 A1 | 1/2016 | Yau et al. |
| 2020/0076860 A1 | 3/2020 | Motukuru et al. |
| 2020/0302431 A1 | 9/2020 | Polehn et al. |
| 2020/0364525 A1 | 11/2020 | Mats et al. |
| 2022/0038289 A1 | 2/2022 | Huang |
| 2022/0215382 A1* | 7/2022 | Chen ................ G06Q 30/0251 |
| 2023/0017499 A1* | 1/2023 | Agrawal ............... G06N 20/00 |

* cited by examiner

SYSTEM FOR PROCESSING MOBILE RESOURCE TRANSFERS USING SECURE TOKENS ON A DISTRIBUTED REGISTER

FIELD OF THE INVENTION

The present disclosure embraces a system for processing mobile resource transfers using secure tokens on a distributed register.

BACKGROUND

There is a need for an efficient and expedient way to execute resource transfers.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for processing mobile resource transfers using secure tokens on a distributed register. In particular, each mobile device may be associated with a unique, immutable data identifier that may be stored within the distributed register. Resource transfers initiated by the mobile device may be authenticated by the resource transfer servers using the secure token associated with the mobile device along with the resource transfer data or metadata transmitted by the mobile device. Based on the historical data associated with the mobile device in conjunction with the secure token and resource transfer data and metadata, the resource transfer server may initiate an authorization process on the resource transfer requested by the mobile device. In this way, the system provides a secure way to process mobile resource transfers.

Accordingly, embodiments of the present disclosure provide a system for processing mobile resource transfers using secure tokens on a distributed register, the system comprising a memory device with computer-readable program code stored thereon; a communication device; and a processing device operatively coupled to the memory device and the communication device, wherein the processing device is configured to execute the computer-readable program code to receive, from a mobile device, a request to process a mobile resource transfer, wherein the request comprises resource transfer data and metadata; authenticate the mobile device by reading a secure token associated with the mobile device, wherein the secure token is stored within the distributed register; identify an account associated with the user based on the secure token associated with the mobile device; validate the request based on the historical data associated with the mobile device; and process the request based on validating the request.

In some embodiments, validating the request comprises generating a user portrait associated with the user based on the historical data; and detecting, using machine learning algorithms on the user portrait and the request, that the request is consistent with the user portrait, wherein processing the request comprises authorizing the mobile resource transfer and transferring resources from the account associated with the user to a third party based on the resource transfer data and metadata.

In some embodiments, validating the request comprises generating a user portrait associated with the user based on the historical data; and detecting, using machine learning algorithms on the user portrait and the request, that the request is inconsistent with the user portrait, wherein processing the request comprises automatically blocking the mobile resource transfer.

In some embodiments, processing the request further comprises transmitting an alert to the mobile device, wherein the alert comprises a notification that the mobile resource transfer has been blocked, wherein the notification comprises one or more interactable elements for receiving input from the user for confirming the mobile resource transfer.

In some embodiments, processing the request further comprises receiving a user input confirming the mobile resource transfer; and based on receiving the user input, authorizing and processing the mobile resource transfer.

In some embodiments, the secure token comprises a hash output value generated from information associated with the mobile device, wherein the hash output value is stored as a non-fungible token within the distributed register.

In some embodiments, the mobile device is a network-enabled smart car.

Embodiments of the present disclosure also provide a computer program product for processing mobile resource transfers using secure tokens on a distributed register, the computer program product comprising at least one non-transitory computer readable medium having computer-readable program code portions embodied therein, the computer-readable program code portions comprising executable portions for receiving, from a mobile device, a request to process a mobile resource transfer, wherein the request comprises resource transfer data and metadata; authenticating the mobile device by reading a secure token associated with the mobile device, wherein the secure token is stored within the distributed register; identifying an account associated with the user based on the secure token associated with the mobile device; validating the request based on the historical data associated with the mobile device; and processing the request based on validating the request.

In some embodiments, validating the request comprises generating a user portrait associated with the user based on the historical data; and detecting, using machine learning algorithms on the user portrait and the request, that the request is consistent with the user portrait, wherein processing the request comprises authorizing the mobile resource transfer and transferring resources from the account associated with the user to a third party based on the resource transfer data and metadata.

In some embodiments, validating the request comprises generating a user portrait associated with the user based on the historical data; and detecting, using machine learning algorithms on the user portrait and the request, that the request is inconsistent with the user portrait, wherein processing the request comprises automatically blocking the mobile resource transfer.

In some embodiments, processing the request further comprises transmitting an alert to the mobile device, wherein the alert comprises a notification that the mobile resource transfer has been blocked, wherein the notification comprises one or more interactable elements for receiving input from the user for confirming the mobile resource transfer.

In some embodiments, processing the request further comprises receiving a user input confirming the mobile resource transfer; and based on receiving the user input, authorizing and processing the mobile resource transfer.

In some embodiments, the secure token comprises a hash output value generated from information associated with the mobile device, wherein the hash output value is stored as a non-fungible token within the distributed register.

Embodiments of the present disclosure also provide a computer-implemented method for processing mobile resource transfers using secure tokens on a distributed register, the computer-implemented method comprising receiving, from a mobile device, a request to process a mobile resource transfer, wherein the request comprises resource transfer data and metadata; authenticating the mobile device by reading a secure token associated with the mobile device, wherein the secure token is stored within the distributed register; identifying an account associated with the user based on the secure token associated with the mobile device; validating the request based on the historical data associated with the mobile device; and processing the request based on validating the request.

In some embodiments, validating the request comprises generating a user portrait associated with the user based on the historical data; and detecting, using machine learning algorithms on the user portrait and the request, that the request is consistent with the user portrait, wherein processing the request comprises authorizing the mobile resource transfer and transferring resources from the account associated with the user to a third party based on the resource transfer data and metadata.

In some embodiments, validating the request comprises generating a user portrait associated with the user based on the historical data; and detecting, using machine learning algorithms on the user portrait and the request, that the request is inconsistent with the user portrait, wherein processing the request comprises automatically blocking the mobile resource transfer.

In some embodiments, processing the request further comprises transmitting an alert to the mobile device, wherein the alert comprises a notification that the mobile resource transfer has been blocked, wherein the notification comprises one or more interactable elements for receiving input from the user for confirming the mobile resource transfer.

In some embodiments, processing the request further comprises receiving a user input confirming the mobile resource transfer; and based on receiving the user input, authorizing and processing the mobile resource transfer.

In some embodiments, the secure token comprises a hash output value generated from information associated with the mobile device, wherein the hash output value is stored as a non-fungible token within the distributed register.

In some embodiments, the mobile device is a network-enabled smart car.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
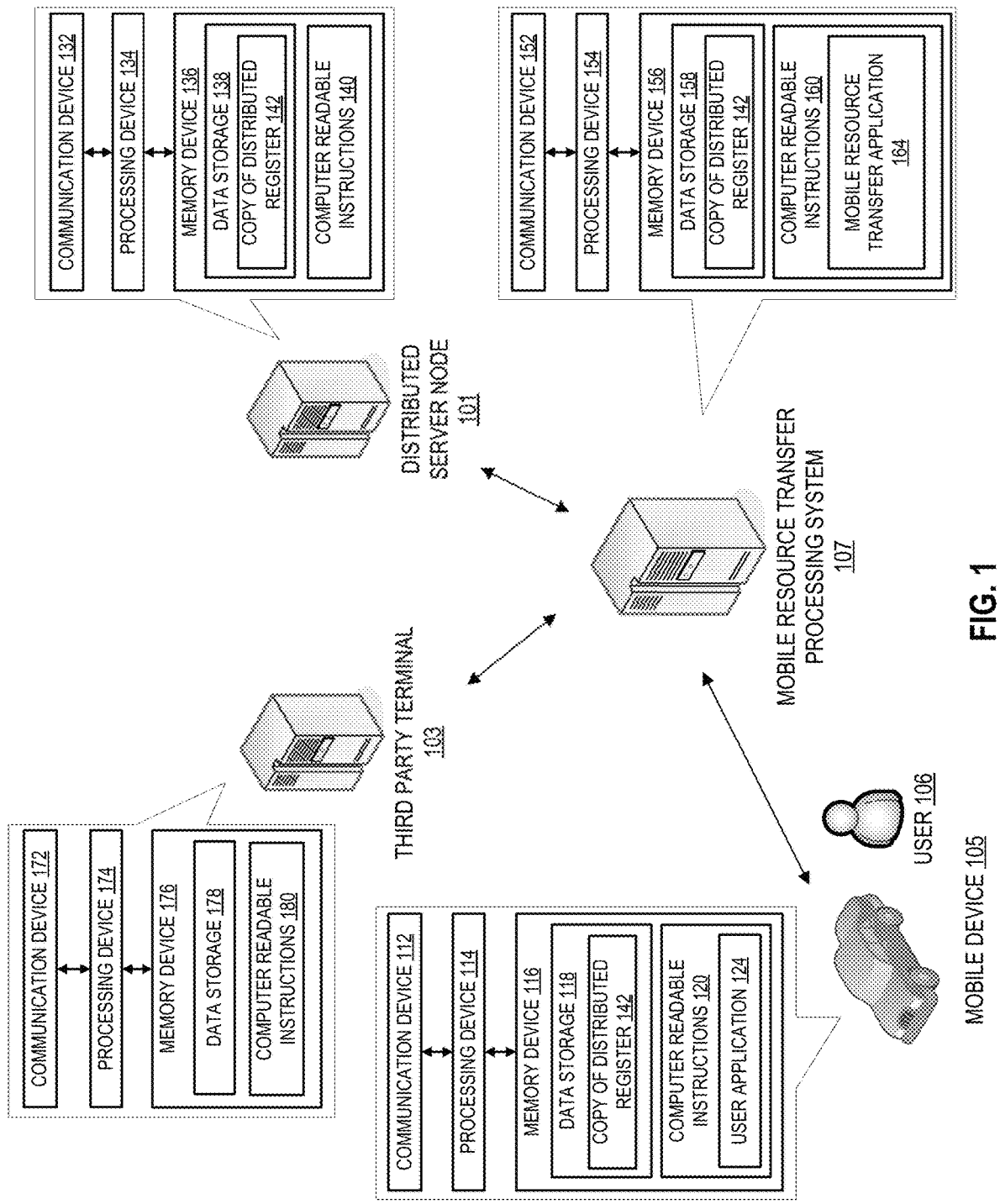
Figure 2:
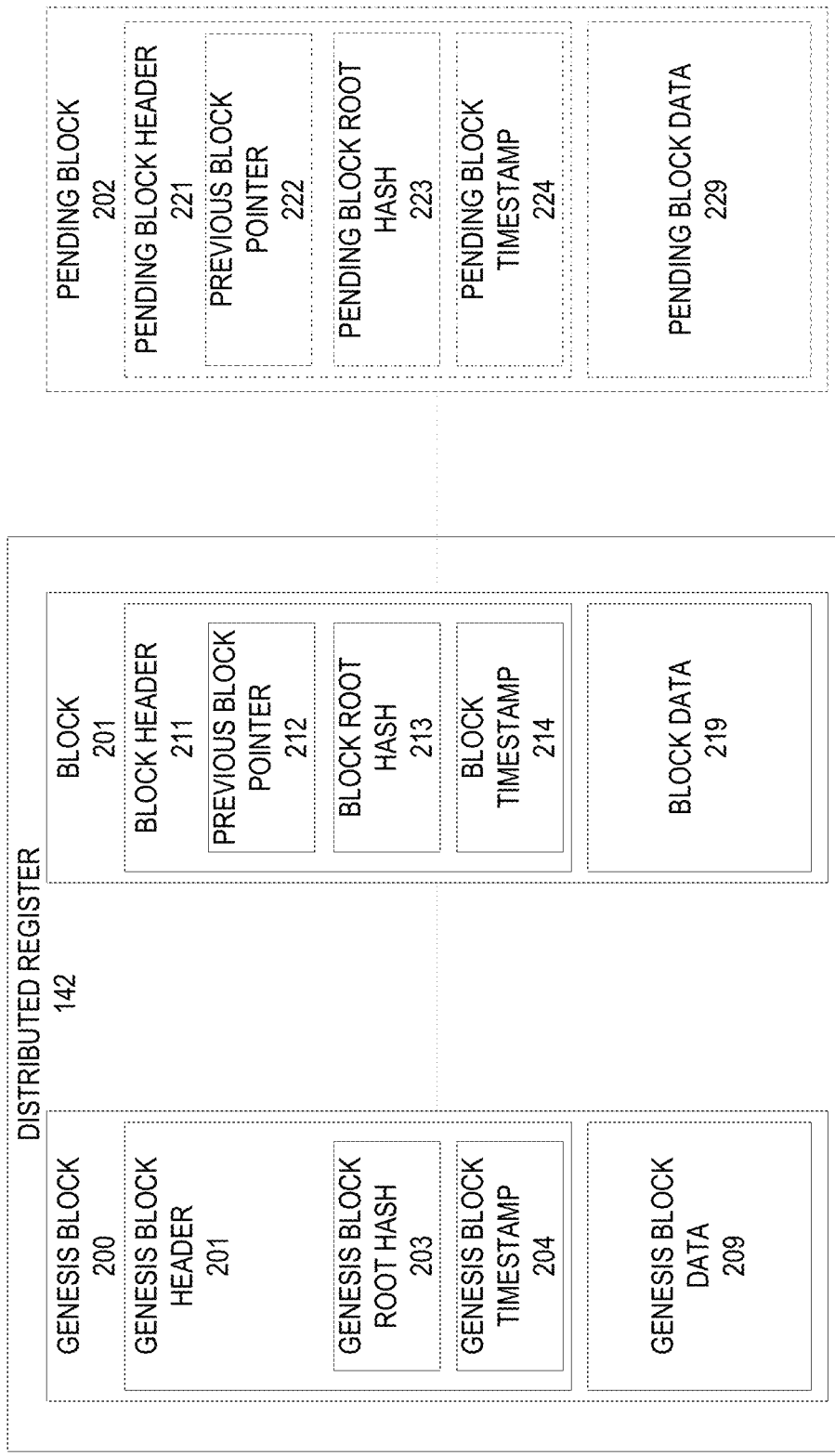
Figure 3:
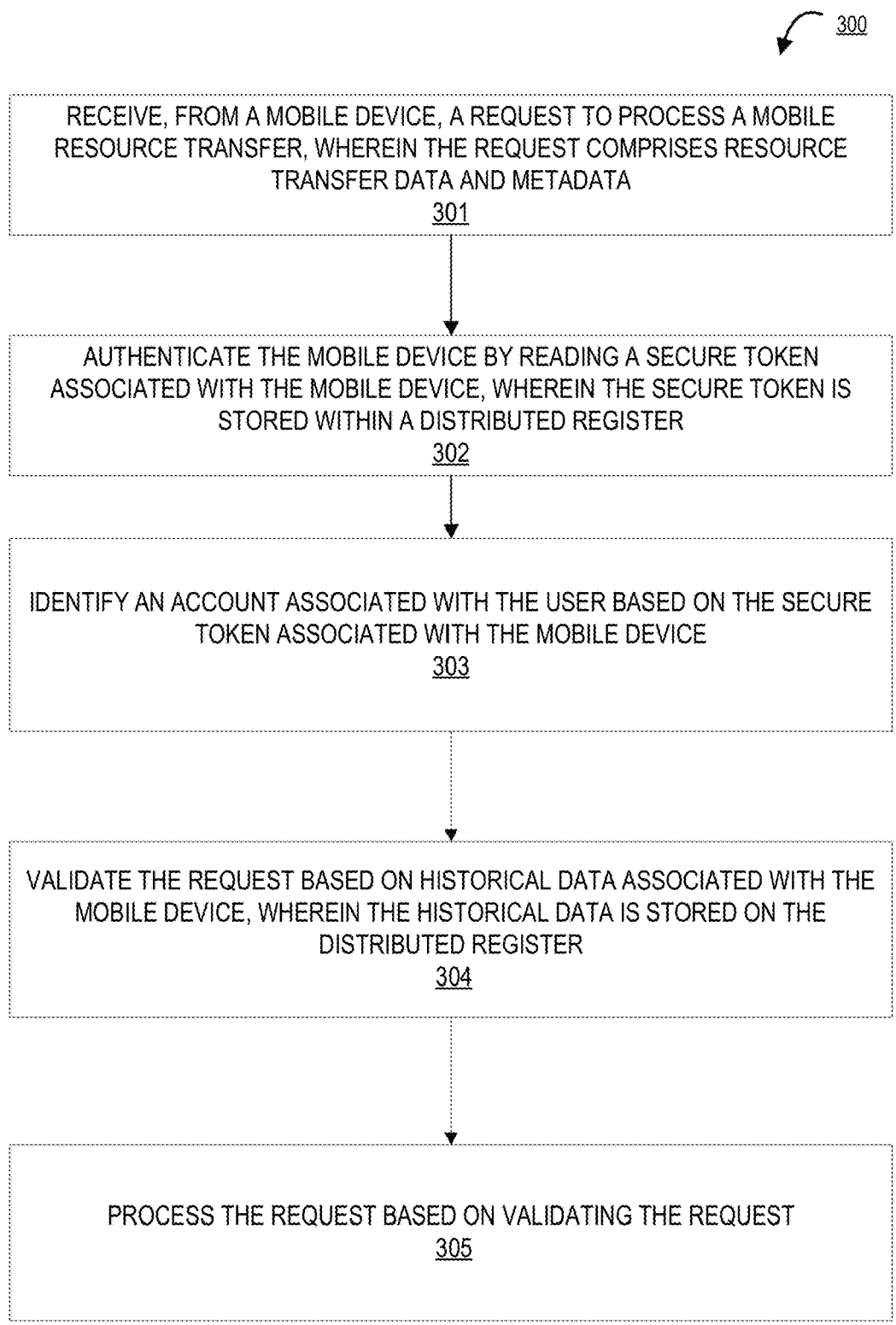

Having thus described embodiments of the invention in general terms, reference will now be made to the accompanying drawings, wherein:

FIG. 1 illustrates an operating environment for the secure mobile resource transfer processing system, in accordance with one embodiment of the present disclosure;

FIG. 2 is a block diagram illustrating the data structures within an exemplary distributed register, in accordance with one embodiment of the present disclosure; and FIG. 3 is a flow diagram illustrating a process for processing mobile resource transfers using secure tokens on a distributed register, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein. In particular, "mobile device" may refer to a computing device that may be installed in or associated with a vehicle such as a smart car.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed register" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed register" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

"Resource" as used herein may refer to tangible or intangible objects which may be held, owned, or used by a user and/or the entity. In this regard, examples of such resources may include electronic data files, documents, computing devices and/or other types of electronic hardware, funds, financial instruments, computing resources, or the like. In some embodiments, a resource may be associated with one or more accounts (e.g., a user account). Accordingly, "resource transfer" or "resource transfer process" as used herein may refer to a transfer of resources from a resource origin to a resource destination, such as a data transfer, provisioning of hardware, transaction (e.g., funds transfer), or the like.

"Non-fungible token" or "NFT" as used herein may refer to data stored in a distributed register that may comprise a signature (e.g., a hash value or address) associated with a digital resource, where the signature certifies that the digital resource is unique (i.e., not interchangeable with other resources). The signature may further identify the owner of the digital resource (e.g., a user, entity, or the like). In this regard, the ownership of the digital resource may be governed by a smart contract stored within the distributed register and associated with the digital resource and/or the NFT. Examples of such digital resources may include image files, audio files, video files, documents, web pages, and the like. In particular, the digital resource may include a secure token that may serve as a data identifier associated with a particular computing device (e.g., a mobile device or smart car). In some embodiments, the digital resource may be stored separately from the distributed register (e.g., off-chain on a database server). In other embodiments, the digital resource may be stored within the distributed register (e.g., on-chain within block data).

During the course of travel, a user may initiate various types of resource transfers (e.g., transactions). For example, if the user is traveling by car, the user may transact with toll booths or readers, takeaway restaurants, or the like. Accordingly, the system as provided herein provides an automatic and secure way to initiate and process mobile resource transfers when traveling (e.g., in a vehicle). To this end, the system may comprise one or more mobile devices, where each of the mobile devices are associated with a user. The mobile device may be a computing device that may be installed in or otherwise associated with a vehicle (e.g., a smart car). In some embodiments, the computing device may be a portable device such as a smartphone. In other embodiments, the computing device may be an integrated set of devices that may be affixed or attached to the smart car itself.

The one or more mobile devices may each be connected to one another via a network (e.g., a wireless Internet connection) and may each serve as a node of a distributed register network. In such embodiments, each mobile device may host a copy of a distributed register. Each mobile device may be assigned a unique identifier or token which may then be stored to the distributed register (e.g., as a non-fungible token within a data record of the distributed register). In turn, the token may be associated with data that may be stored by a third party entity (e.g., a financial institution who service an account of the user). For instance, the token may be associated with information such as user information (e.g., identifying information, authentication credentials, or the like), account information (e.g., account number, transaction information, or the like), vehicle information (e.g., VIN, make and model, license plate number, or the like), or the like.

The user may initiate a resource transfer by providing an input to the mobile device (e.g., touch inputs, voice inputs, or the like), which may be equipped with one or more input devices (e.g., touchscreens, microphones, cameras, or the like) to capture the inputs of the user. The mobile device may subsequently transmit the resource transfer data (e.g., transaction data such as a transfer amount, sender and recipient info, and the like), along with a reference to the secure token stored within the distributed register, to a resource transfer server which may be owned and/or operated by the entity. The resource transfer server may identify and authenticate the mobile device by reading the NFT associated with the mobile device from the distributed register. In some embodiments, the resource transfer server may further use machine learning to compare the previous or historical resource transfer data associated with the mobile device and/or user with the live resource transfer data received from the mobile device. If the resource transfer server determines that the live resource transfer data is consistent with the historical resource transfer data, the resource transfer server may authenticate the resource transfer and process the resource transfer according to the parameters within the resource transfer data.

However, if the resource transfer server determines that the live resource transfer data is inconsistent with the historical resource transfer data, the resource transfer server may initiate one or more remediation processes on the resource transfer. For instance, the resource transfer server may transmit a prompt to the mobile device for additional inputs from the user and/or the mobile devices (e.g., an approval or confirmation of the resource transfer, additional authentication credentials, or the like). In other embodiments, the resource transfer server may automatically block the resource transfer from being processed and transmit a notification to the mobile device that the resource transfer has been blocked.

In some embodiments, resource transfer data may be stored within the distributed register. Accordingly, in some embodiments, each of the nodes may participate in the consensus mechanisms for authenticating and processing transactions. In this way, the nodes may contribute to the determination of whether resource transfers are processed (the resource transfer data is appended to the distributed register) or blocked (the resource transfer data is rejected from the distributed register).

An exemplary use case is provided as follows for illustrative purposes only and is not intended to reduce or limit the scope of the disclosure. In one embodiment, a user may be traveling in a vehicle (e.g., a smart car equipped with an integrated internet-connected computing system). The smart car may store a copy of a distributed register thereon, where the distributed register contains a series of data records. The data records may include a secure token (e.g., a non-fungible token) comprising identifying information regarding the smart car and/or the user. For instance, the secure token may include information such as an account number of the user, vehicle make and/or model, VIN, and the like. In some embodiments, the secure token may be a hash value of said information, such that the secure token may serve as a unique, immutable identifier of the vehicle and/or the user. In turn, a financial institution may use the secure token to identify the user and/or vehicle for the purpose of processing transactions.

During the course of travel, the user may wish to initiate a transaction with a third-party system (e.g., a highway toll payment system). To this end, the user may initiate the transaction by providing an input (e.g., a resource transfer request) to the computing device within the vehicle (e.g., by voice command, touchscreen inputs, or the like). In some embodiments, the resource transfer request may include various transaction details, such as the recipient (e.g., the toll payment system), the transaction amount, account for the transaction, or the like. In some embodiments, the smart car may automatically determine the transaction details by interacting with the target system over a network. In this regard, the user may issue a voice command to the smart car, such as "pay the toll." The smart car may then detect that the highway toll payment system is within a threshold distance from the smart car and attempt to initiate a secure connection with the payment system. Once the secure connection is established, the smart car may receive the transaction details from the payment system, including the recipient account information, transaction amount, and the like.

Once the transaction details have been obtained, the smart car may transmit the transaction details along with authentication information to the financial institution. In some embodiments, the transaction details may be submitted by transmitting a proposed data record comprising the transaction details to the various nodes or participants of the distributed register (which may include the financial institution and/or other smart cars). Based on the authentication information and the secure token stored within the distributed register, the financial institution may authenticate the user and/or smart car for the purposes of authorizing and processing the resource transfer request. The user account may then be used to complete the transaction with the toll payment system, either by the smart car or the computing systems of the financial institution. The transaction details may then be stored within the distributed register for use in future detection of unauthorized transactions.

In this regard, in some embodiments, the transaction details may further comprise transaction metadata, such as the method of initiating the resource transfer, authentication credentials provided, and the like. For instance, the system may track the user's touchscreen or key inputs patterns (e.g., cadence or timing between touchscreen or key inputs, length or duration of individual presses, and the like), biometric voice data, and the like. In this way, the distributed register may store not only historical transaction data associated with the user, but also other transaction attributes. Accordingly, the various nodes may use such historical data and/or attributes to authenticate and/or authorize future transactions. For instance, if another resource transfer request is submitted by the smart car which includes voice data that is significantly different from the voice data used to initiate previous transactions (e.g., the current voice data differs in pitch, cadence, or the like), the resource transfer request may be flagged by one or more nodes as being a potentially unauthorized request. Upon detecting the potentially unauthorized request, the system may automatically block the transaction from being processed in real time. The system may further use machine learning processes to adaptively increase the accuracy of the detection of unauthorized requests over time.

The system as described herein confers a number of technological advantages over conventional resource transfer systems, particularly with respect to mobile resource transfers. For instance, by storing information regarding the user, vehicle, and/or transaction within a distributed register and using machine learning processes to detect unauthorized requests, the system provides a secure way to uniquely identify the user and process transactions. Furthermore, the integration of the proposed system with various nodes and/or third-party entities provides a seamless way to initiate and process such resource transfers during travel, which in turn drastically improves the user experience with respect to mobile resource transfers.

Turning now to the figures, FIG. 1 illustrates an operating environment 100 for the secure mobile resource transfer processing system, in accordance with one embodiment of the present disclosure. In particular, FIG. 1 illustrates a mobile resource transfer processing system 107 in operative communication with a mobile device 105, distributed server node 101, and third party terminal 103 over a network. In such a configuration, the computing systems within the network, including the mobile resource transfer processing system 107, mobile device 105, distributed server node 101, and third party terminal 103, may transmit data to and/or receive data from one another through the network.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts a single distributed server node 101, the operating environment may comprise multiple distributed server node, each of which may host a copy of a distributed register. It should also be appreciated that one or more functions of the systems, devices, or servers as depicted in FIG. 1 may be combined into a single system, device, or server and/or performed by other computing systems. For instance, though the mobile resource transfer processing system 107 and third-party terminal 103 are depicted as separate computing systems, it is within the scope of the disclosure for the functions of both computing systems to be executed on a single computing system. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the mobile resource transfer processing system 107 may be a computing system (which may be operated by an entity associated with one or more users, such as a financial institution) that performs the mobile resource transfer processing functions as described herein. Accordingly, the mobile resource transfer processing system 107 may comprise a processing device 154 operatively coupled to a communication device 152 and a memory device 156. The memory device 156 may comprise data storage 158 and computer readable instructions 160 stored thereon, where the computer readable instructions 160 may comprise a mobile resource transfer application 164. The data storage 158 of the mobile resource transfer processing system 107 may comprise a copy of a distributed register 142, where said distributed register may store information regarding mobile resource transfers, such as secure tokens associated with participants in the mobile resource transfer process (e.g., a user or mobile device), historical resource transfer data, behavior or pattern data associated with the user or mobile device, or the like.

The mobile resource transfer application 164 may, when executed by the processor 154 of the mobile resource transfer processing system 107, cause the processor 154 to perform the various mobile resource transfer processing functions, which may include authenticating the user 106 and/or the mobile device 105 (e.g., by reading a secure token associated with the user 106 and/or the mobile device 105 from the copy of the distributed register 142), accessing account information associated with the user 105, transferring resources from the account of the user 105 to the third party terminal 103, performing detection of unauthorized resource transfer requests based on an AI-based analysis of historical resource transfer and/or behavior data, and the like.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

As further illustrated in FIG. 1, the distributed server node 101 may, in combination with other distributed server nodes, form a cluster of nodes that host a distributed register on which digital resources (e.g., secure tokens or NFT's) may be stored. Accordingly, the distributed server node 101 may comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, WiFi or Ethernet adapter, radio transceiver, or other device for communicating with other devices on the network.

The memory device 136 comprises computer-readable instructions 140 and data storage 138, where the data storage 138 may comprise a copy of a distributed register 142. The distributed register (and the copy of the distributed register 142), as described elsewhere, may comprise a series of data records relevant to the objectives of an entity associated with the distributed server network 109. In this regard, the distributed server node 101, along with any other computing systems that host a copy of the distributed register 142 (e.g., the mobile device 105 and/or the mobile resource transfer processing system 107), may be able to read data from the distributed register, submit data records to the distributed register, participate in consensus mechanisms, or the like.

As further illustrated in FIG. 1, the mobile device 105 may be in operative communication with the distributed server node 101, the mobile resource transfer processing system 107, and/or the third party terminal 103. The mobile device 105 may be a device that may be owned and/or operated by a user 106 in transit, where the user may be a customer of the entity. In this regard, the mobile device 105 may be a smart car or a smartphone operated by the user 105 to conduct mobile resource transfers.

Accordingly, the mobile device 105 may comprise a communication device 112, a processing device 114, and a memory device 116. In some embodiments, the mobile device 105 may comprise hardware and/or software components that allow the mobile device 105 to interface with the user 106. In such embodiments, the mobile device 105 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The memory device 116 of the mobile device 105 may further comprise data storage 118 and computer-readable instructions 120 stored thereon, where the computer-readable instructions 120 may comprise a user application 124. The data storage 118 of the mobile device 105 may comprise a copy of the distributed register 142. The user application 124 may be a software application that the user 106 may initiate resource transfers (e.g., by communicating with the third party terminal 103 and/or the mobile resource transfer processing system 107). To this end, the mobile device 105 may transmit a resource transfer request (e.g., a proposed data record to be appended to the distributed register) to the mobile resource transfer processing system, where the resource transfer request may include a reference to the secure token associated with the mobile device 105 and/or the user 106 along with resource transfer data and/or metadata. The mobile resource transfer processing system 107 may then process the resource transfer request as described elsewhere herein. In some embodiments, the mobile device 105 may perform various functions using its copy of the distributed register 142. For instance, the mobile device 105 may participate in consensus of data records, perform validation of proposed transactions (e.g., submitted by other mobile devices or distributed server nodes), and the like.

As shown in FIG. 1, the operating environment may further comprise a third party terminal 103. The third party terminal 103 may be a computing system that may interact with other computing devices for the purpose of completing resource transfers. In this regard, the third party terminal 103 may be a point-of-sale system, payment processing device, or the like. In such an embodiment, the third party terminal 103 may receive resource transfers from the mobile resource transfer processing system 107 on behalf of the user 106. Accordingly, the third party terminal 103 may comprise a processing device 174 operatively coupled to a communication device 172 and a memory device 176, where the memory device 176 may comprise data storage 178 and computer readable instructions 180.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary distributed register, in accordance with some embodiments. In particular, FIG. 2 depicts a plurality of blocks 200, 201 within the distributed register 142, in addition to a pending block 202 that has been submitted to be appended to the distributed register 142. The distributed register 142 may comprise a genesis block 200 that serves as the first block and origin for subsequent blocks in the distributed register 142. The genesis block 200, like all other blocks within the distributed register 142, comprise a block header 201 and block data 209. The genesis block data 209, or any other instances of block data within the distributed register 142 (or any other distributed register) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the distributed register 142. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the distributed register 142, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the distributed register 142. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the distributed register 142. A pending block timestamp 224 may also be added to signify the time at which the pending block 202 is added to the distributed register 142.

In other embodiments, the consensus mechanism may be based on a total number of consensus inputs submitted by the nodes of the distributed register 142, e.g., a PBFT consensus mechanism. Once a threshold number of consensus inputs to validate the pending block 202 has been reached, the pending block 202 may be appended to the distributed register 142. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 3 is a flow diagram illustrating a process flow 300 for processing mobile resource transfers using secure tokens on a distributed register, in accordance with one embodiment of the present disclosure. The process begins at block 301, where the system receives, from a mobile device, a request to process a mobile resource transfer, wherein the request comprises resource transfer data and metadata. In one embodiment, a user may wish to initiate a mobile resource transfer (e.g., a funds transaction) while traveling. In this regard, the mobile device may be an Internet-connected smart car that may host a distributed register thereon.

To this end, the user may initiate a resource transfer (e.g., payment for fuel) with a third party terminal or device (e.g., a point-of-sale system or payment terminal) by submitting the request to initiate the mobile resource transfer. For instance, the smart car may submit resource transfer data and/or metadata (e.g., recipient information, a reference to the secure token associated with the smart car, transaction amount, description of the transaction, or the like) to the financial institution's systems. The smart car may communicate with the third party terminal (e.g., over the Internet and/or through wireless communication technologies such as NFC, Wi-Fi, Bluetooth, or the like) to automatically obtain the needed information to generate the resource transfer data and/or metadata to be transmitted to the financial institution's systems.

In some embodiments, the process may be initiated by the user based on a user-initiated input (e.g., a voice command to the smart car, such as "pay the toll"). In other embodiments, the smart car may communicate with the third party terminal to receive the data related to the transaction and prompt the user to initiate the resource transfer. For instance, receiving the transaction data from the third party terminal may cause the smart car to present an on-screen notification on the touchscreen of the smart car, or play a voiced sound alert playing through the speakers (e.g., "would you like to make a payment?"). Once the user accepts the prompt, the smart car may transmit the resource transfer data and metadata to the financial institution systems to begin the resource transfer.

The process continues to block 302, where the system authenticates the mobile device by reading a secure token associated with the mobile device, wherein the secure token is stored within a distributed register. The distributed register may include a secure token that uniquely identifies the smart car. In some embodiments, the secure token may be stored as a non-fungible token, where the token is a hash output value obtained by inputting various types of identifying data regarding the smart car into a hash algorithm. Such identifying data may include a vehicle make and/or model, VIN, ownership information, or the like. In turn, the secure token may be associated with each data record (e.g., resource transfer requests) submitted by the smart car. Accordingly, the NFT stored within the distributed register may be used for authentication and/or authorization purposes for any third party entity with which the smart car and/or the user may interact (e.g., a financial institution that may maintain an account for the user).

The process continues to block 303, where the system identifies an account associated with the user based on the secure token associated with the mobile device. In some embodiments, such account information may be stored on the financial institution's systems. In other embodiments, the account information may be stored within the distributed register in encrypted form. The account associated with the user may contain one or more resources (e.g., funds) which may be used to process the resource transfer request.

The process continues to block 304, where the system validates the request based on historical data associated with the mobile device, wherein the historical data is stored on the distributed register. The distributed register may store information regarding the smart car's interactions with the distributed register. In this regard, the information may include previous resource transfer request (along with associated data and metadata), behavior patterns (e.g., transaction habits), location data, or the like. In this way, the system may build a portrait associated with a user (a "user portrait") based on the historical data. For instance, a user portrait may indicate that the user typically travels to certain locations (e.g., certain states) and makes certain types of purchases (e.g., a transaction for a particular good and/or a particular price).

Based on the user portrait, the system may use machine learning algorithms to learn the behaviors regarding resource transfer requests submitted by the user and/or the smart car. Subsequently, the machine learning algorithms may be used to determine whether the current resource transfer request is consistent with the user portrait. If the current resource transfer is similar (e.g., as determined by the neural networks) to the past behaviors of the user and/or the smart car as detailed in the user portrait, the system may authorize the transaction to proceed. However, if the current resource transfer request is inconsistent with the user portrait (e.g., a similarity score calculated for the current resource transfer request falls below a certain threshold), the system may automatically block the transaction from proceeding. In such an embodiment, the system may be configured to transmit an alert to the smart car or other mobile device associated with the user (e.g., a smartphone), which may cause the smart car to present a notification on the display of the smart car indicating that the transaction has been blocked. The notification may further comprise one or more interactive elements or options for responding to the notification to confirm the transaction. In some embodiments, the system may request further authentication credentials (e.g., a username and password, biometric data, or the like) from the user before allowing the transaction to proceed. In other embodiments, the notification may comprise a notice that the transaction has failed and an explanation of why the transaction failed.

The process concludes at block 305, where the system processes the request based on validating the request. For instance, if the request is validated by the system, the system may transfers resources from the account associated with the user to a third party based on the resource transfer data and metadata. In this regard, the system may transmit the account details associated with the secure token (and thus the smart car) to the smart car, such that the smart car may proceed with the transaction with the third party terminal. In other embodiments, the entity may directly transfer the resources from the user's account to the third party terminal. In this way, the system may provide an expedient and secure way to conduct mobile resource transfers.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for processing mobile resource transfers using secure tokens on a distributed register, the system comprising:
   a memory device with computer-readable program code stored thereon;
   a communication device; and
   a processing device operatively coupled to the memory device and the communication device, wherein the processing device is configured to execute the computer-readable program code to:
      receive, from a mobile device, a request to process a mobile resource transfer, wherein the request comprises resource transfer data and metadata;
      authenticate the mobile device by reading a secure token associated with the mobile device, wherein the secure token is stored within the distributed register;
      identify an account associated with a user based on the secure token associated with the mobile device;
      validate the request based on historical data associated with the mobile device; and
      process the request based on validating the request.

2. The system according to claim 1, wherein validating the request comprises:
   generating a user portrait associated with the user based on the historical data; and
   detecting, using machine learning algorithms on the user portrait and the request, that the request is consistent with the user portrait,
   wherein processing the request comprises authorizing the mobile resource transfer and transferring resources from the account associated with the user to a third party based on the resource transfer data and the metadata.

3. The system according to claim 1, wherein validating the request comprises:
   generating a user portrait associated with the user based on the historical data; and
   detecting, using machine learning algorithms on the user portrait and the request, that the request is inconsistent with the user portrait,
   wherein processing the request comprises automatically blocking the mobile resource transfer.

4. The system according to claim 3, wherein processing the request further comprises transmitting an alert to the mobile device, wherein the alert comprises a notification that the mobile resource transfer has been blocked, wherein the notification comprises one or more interactable elements for receiving input from the user for confirming the mobile resource transfer.

5. The system according to claim 4, wherein processing the request further comprises:
receiving a user input confirming the mobile resource transfer; and
based on receiving the user input, authorizing and processing the mobile resource transfer.

6. The system according to claim 1, wherein the secure token comprises a hash output value generated from information associated with the mobile device, wherein the hash output value is stored as a non-fungible token within the distributed register.

7. The system according to claim 1, wherein the mobile device is a network-enabled smart car.

8. A computer program product for processing mobile resource transfers using secure tokens on a distributed register, the computer program product comprising at least one non-transitory computer readable medium having computer-readable program code portions embodied therein, the computer-readable program code portions comprising executable portions for:
receiving, from a mobile device, a request to process a mobile resource transfer, wherein the request comprises resource transfer data and metadata;
authenticating the mobile device by reading a secure token associated with the mobile device, wherein the secure token is stored within the distributed register;
identifying an account associated with a user based on the secure token associated with the mobile device;
validating the request based on historical data associated with the mobile device; and
processing the request based on validating the request.

9. The computer program product of claim 8, wherein validating the request comprises:
generating a user portrait associated with the user based on the historical data; and
detecting, using machine learning algorithms on the user portrait and the request, that the request is consistent with the user portrait,
wherein processing the request comprises authorizing the mobile resource transfer and transferring resources from the account associated with the user to a third party based on the resource transfer data and the metadata.

10. The computer program product of claim 8, wherein validating the request comprises:
generating a user portrait associated with the user based on the historical data; and
detecting, using machine learning algorithms on the user portrait and the request, that the request is inconsistent with the user portrait,
wherein processing the request comprises automatically blocking the mobile resource transfer.

11. The computer program product of claim 10, wherein processing the request further comprises transmitting an alert to the mobile device, wherein the alert comprises a notification that the mobile resource transfer has been blocked, wherein the notification comprises one or more interactable elements for receiving input from the user for confirming the mobile resource transfer.

12. The computer program product of claim 11, wherein processing the request further comprises:
receiving a user input confirming the mobile resource transfer; and
based on receiving the user input, authorizing and processing the mobile resource transfer.

13. The computer program product of claim 8, wherein the secure token comprises a hash output value generated from information associated with the mobile device, wherein the hash output value is stored as a non-fungible token within the distributed register.

14. A computer-implemented method for processing mobile resource transfers using secure tokens on a distributed register, the computer-implemented method comprising:
receiving, from a mobile device, a request to process a mobile resource transfer, wherein the request comprises resource transfer data and metadata;
authenticating the mobile device by reading a secure token associated with the mobile device, wherein the secure token is stored within the distributed register;
identifying an account associated with a user based on the secure token associated with the mobile device;
validating the request based on historical data associated with the mobile device; and
processing the request based on validating the request.

15. The computer-implemented method of claim 14, wherein validating the request comprises:
generating a user portrait associated with the user based on the historical data; and
detecting, using machine learning algorithms on the user portrait and the request, that the request is consistent with the user portrait,
wherein processing the request comprises authorizing the mobile resource transfer and transferring resources from the account associated with the user to a third party based on the resource transfer data and the metadata.

16. The computer-implemented method of claim 14, wherein validating the request comprises:
generating a user portrait associated with the user based on the historical data; and
detecting, using machine learning algorithms on the user portrait and the request, that the request is inconsistent with the user portrait,
wherein processing the request comprises automatically blocking the mobile resource transfer.

17. The computer-implemented method of claim 16, wherein processing the request further comprises transmitting an alert to the mobile device, wherein the alert comprises a notification that the mobile resource transfer has been blocked, wherein the notification comprises one or more interactable elements for receiving input from the user for confirming the mobile resource transfer.

18. The computer-implemented method of claim 17, wherein processing the request further comprises:
receiving a user input confirming the mobile resource transfer; and
based on receiving the user input, authorizing and processing the mobile resource transfer.

19. The computer-implemented method of claim 14, wherein the secure token comprises a hash output value generated from information associated with the mobile device, wherein the hash output value is stored as a non-fungible token within the distributed register.

20. The computer-implemented method of claim 14, wherein the mobile device is a network-enabled smart car.

* * * * *